April 9, 1968 D. R. CARR ET AL 3,377,594
PORTABLE ANTENNA CONSTRUCTION
Filed Oct. 16, 1964 2 Sheets-Sheet 1

DONALD R. CARR
ALFONSO A. BRACCINI
INVENTORS.

BY *Lyon & Lyon*

ATTORNEYS

DONALD R. CARR
ALFONSO A. BRACCINI
INVENTORS.

BY Lyon & Lyon
ATTORNEYS 3,377,594
PORTABLE ANTENNA CONSTRUCTION
Donald R. Carr, Lemon Grove, and Alfonso A. Braccini, La Mesa, Calif., assignors to Whittaker Corporation, Los Angeles, Calif., a corporation of California
Filed Oct. 16, 1964, Ser. No. 404,344
2 Claims. (Cl. 343—713)

ABSTRACT OF THE DISCLOSURE

A portable microwave antenna reflector uses a trailer bed for its transport as well as for its tower when the antenna is erected, the trailer bed being raisable from its normal horizontal position to a vertical position and the reflector being collapsible, a drive box is interposed between the trailer bed and the reflector such that the reflector may be pivoted about one of its mutually perpendicular axes to facilitate erection and to allow scanning of the erected reflector in either a horizontal or vertical plane.

---

The present invention relates to a collapsible and portable antenna construction.

It is therefore a general object of the present invention to provide an antenna construction having the above indicated features.

A specific object of the present invention is to provide an arrangement whereby an antenna may be rendered transportable in a quick and expeditious manner.

Another specific object of the present invention is to provide a transport system for an antenna wherein a trailer bed serves the dual functions of a support for the collapsed antenna and a tower for the extended antenna.

Another specific object of the present invention is to provide a novel structural arrangement whereby an antenna reflector may be collapsed or extended in a simple and expeditious manner.

Another specific object of the present invention is to provide a system of this character incorporating novel means for effecting an X axis and a Y axis adjustment.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

Figure 1:
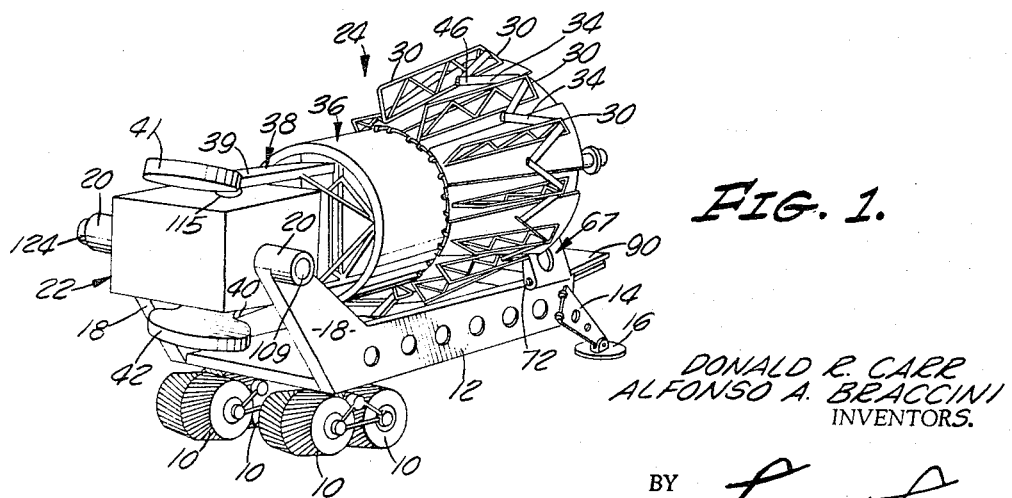
FIG. 1 illustrates an antenna in its collapsed condition for transport in accordance with features of the present invention.

Referring to FIG. 1, the same shows a vehicle in the form of a trailer having four wheels 10 at one end of its chassis or trailer bed 12, the other end of the trailer bed 12 being illustrated as being supported by a pair of arms 14 hinged on opposite sides of the bed 12, with the lower ends of each of such arms 12 having a ground anchor 16 pivoted thereon. These arms 14 are maintained in an upward pivoted position when the vehicle is transported as a trailer.

The trailer bed 12 is formed with a pair of upwardly extending arms 18 which together with the chassis 12 form a yoke structure having a pair of aligned hub members 20, 20 for supporting a drive box 22, on which, in turn, a reflector structure 24 is rotatably supported.

Figure 2:
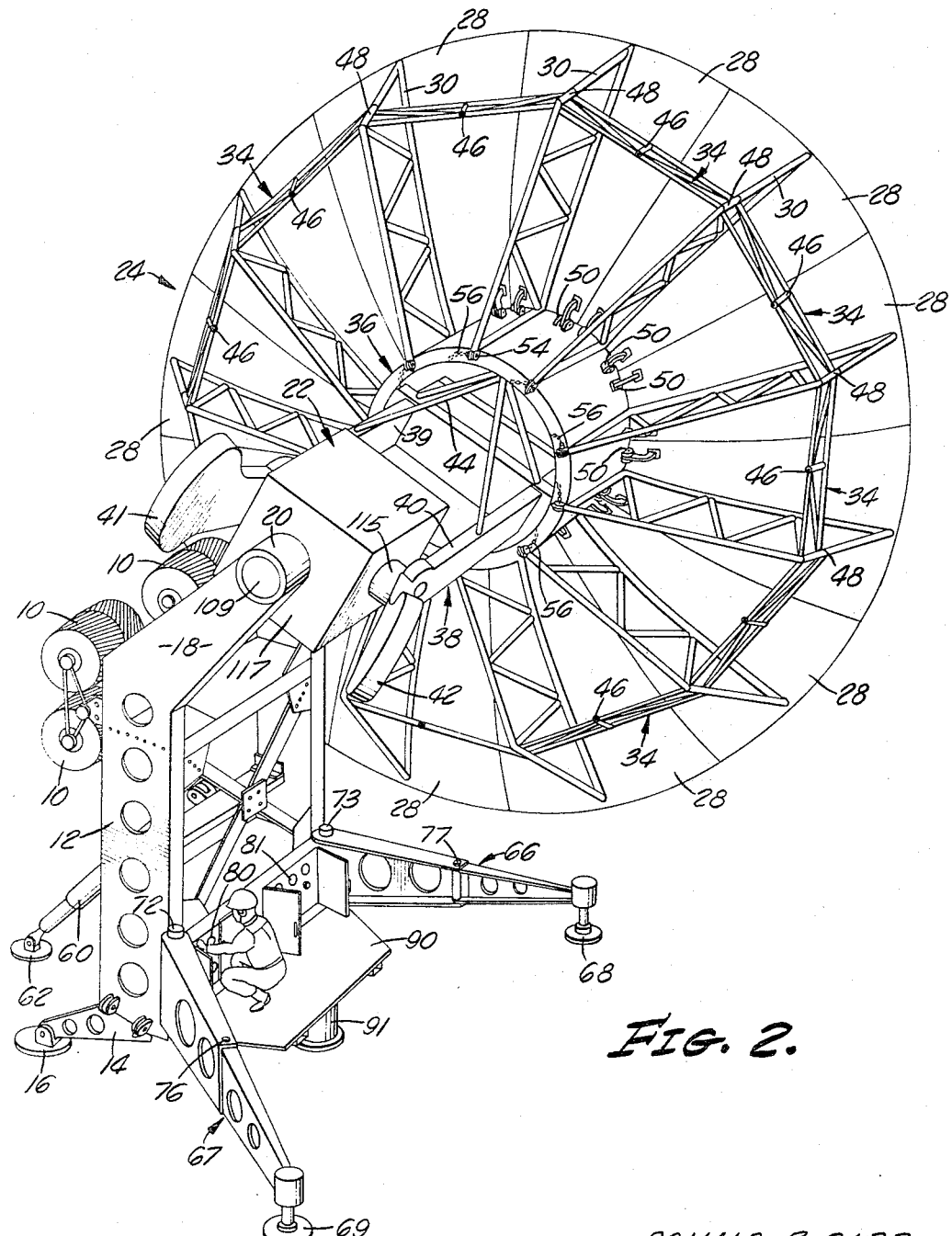
FIG. 2 illustrates the same in its extended condition.

This reflector structure 24, as seen in FIG. 2, includes generally: gore-shaped reflecting panels 28 defining a parabolic inner surface; a radial truss member 30 for each panel to which the central outer portion of a corresponding panel is secured; intercostal frames 34 between adjacent trusses 30; a central hub member 36; a transition structure 38 which includes a pair of arms 39, 40 rotatably supported on the previously mentioned drive box 22, and also braces 44 interconnecting these arms to the hub 36; and a pair of counterweights 41 and 42 on the ends of arms 39, 40, respectively.

The intercostal frames 34 comprise generally two hinged sections with adjacent ends of the sections being hinged together at 46 and their extremities being hinged to a corresponding radial truss 30 at 48.

Each panel 28 is hinged at 50 to the center hub member 36 to which the inner end of each truss member 30 is releasably secured by a removable pin 54 passing through aligned apertured portions of the truss 30 and hub member 36, the pins 54 being attached to the hub member 36 by means of a corresponding chain 56 to prevent pin loss upon removal.

In erecting the antenna, the trailer bed 12 is raised from its horizontal position in FIG. 1 to its vertical position shown in FIG. 2, wherein it then serves as a tower for the antenna. To facilitate this raising, a hydraulic jack 60 is pivotally mounted on the underside of the trailer bed, the jack 60 carrying a ground anchor 62. In the process of raising the trailer bed, the ground anchor 16 pivots on its arm 14 and also stabilizing booms or outriggers 66 and 67 having ground anchors 68 and 69, respectively, on their ends are unfolded manually. These outriggers 66, 67 have their inner ends hinged at 72 and 73 to the trailer bed 12 and are each of two sections hinged together respectively at 76 and 77 so that normally in transport these outriggers, as shown in FIG. 1, are used as a support structure for the collapsed reflector. It should therefore be noted that unfolding of these outriggers 66 and 67 requires initial rotation of the reflector structure 24, and this may be accomplished manually by pivoting the reflector structure 24 together with the drive box 22 about the axis of the hub members 20, preferably when the trailer bed is partially raised by jack 60 to such an extent as to allow convenient unfolding of the outriggers 66, 67.

When the outriggers are thus unfolded, access is then had to control panels 80, 81 whereby further movement and positioning of the reflector structure 24 may be accomplished using hydraulic motors as described later.

To complete erection of the reflector structure, the panels 28 are folded outwardly with the intercostal members 46 pivoting to allow this panel movement; and when the panels are fully extended, the pins 54 are inserted to lock the radial trusses 30, which mount the panels, to the hub member 36.

A platform or ramp member 90 may be hingedly secured to the trailer bed 12, and the same may be braced by a ground engaging leg 91, as seen in FIG. 2.

Figure 3:
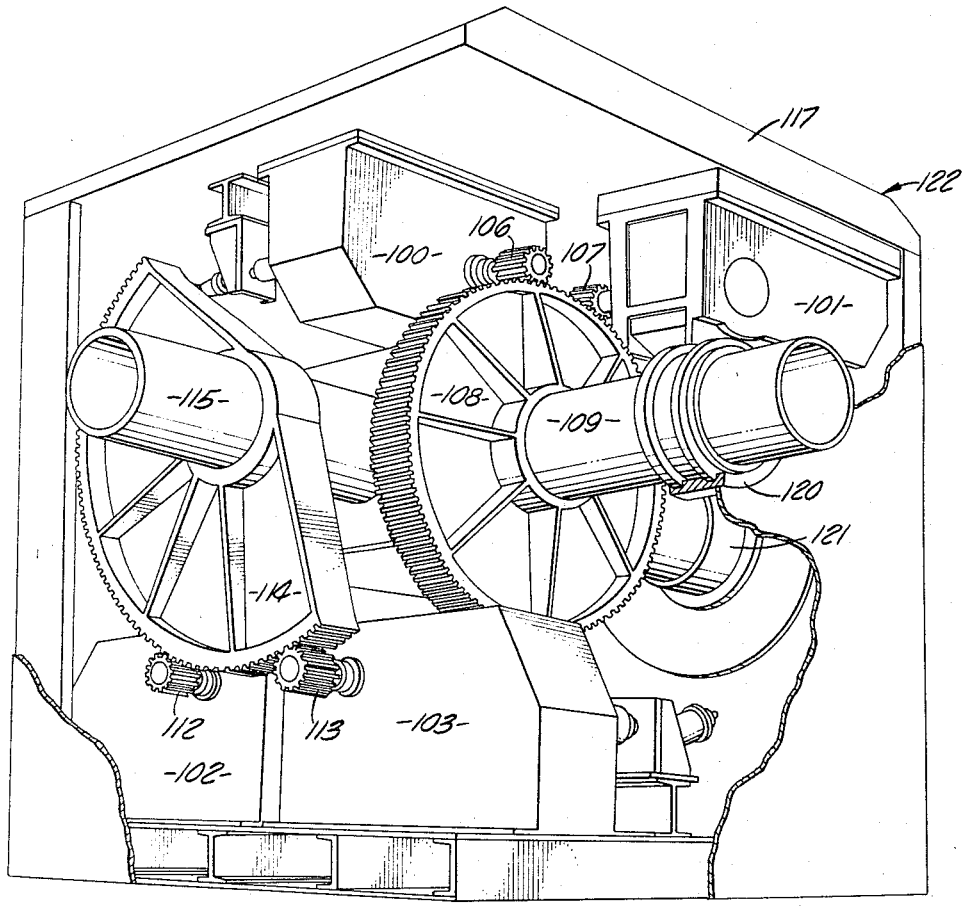
FIG. 3 is an enlarged view of internal mechanisms in a portion of the apparatus shown in FIGS. 1 and 2.

Internal mechanism of the drive box 22 is shown in FIG. 3, and the same includes two pairs of hydraulic motors 100, 101 and 102, 103, the pair 100, 101 being used generally for horizontal or X axis control, and the other pair 102, 103 being used generally for elevation or Y axis control. The motors 100, 101 have a corresponding drive gear 106, 107 meshing with a gear 108 on shaft 109. The motors 102, 103 have a corresponding drive gear 112, 113 meshing with a sector gear 114 on shaft 115. The axes of shafts 109 and 115 are perpendicular to each other.

Two hydraulic motors are used for each drive, one for producing rotation of the corresponding gear 108, 114 in one direction and the other for producing rotation in the opposite direction. Also, when both hydraulic motors for a particular gear 108 or 114 are partially energized, the corresponding gear 108, 114 is locked without any resulting backlash.

These shafts 109, 115 are journalled for rotation in trunnions 120, 121 in and on the casing 117 of drive box 22, the shaft 115, a double-ended shaft, having its ends secured respectively to arms 39, 40, and the shaft 109, a single-ended shaft, being secured to one of the hub members 20, the other hub member 20 being secured to a support shaft 124 aligned with shaft 109, but being free to rotate in a trunnion (not shown) in and on housing 117.

Thus, when both gears 108, 114 are locked with respect to housing 117 of drive box 22, as previously described, the reflector assembly 24 is maintained in an adjusted position. When, for example, motor 102 is fully energized and motor 103 is deenergized, and with the gear 108 remaining locked to the casing housing 117 via gears 106, 107, the shaft 115 and the arms 39, 40 connected thereto rotate with respect to the stationary housing 117 to effect an elevation or Y adjustment. When, for example, motor 100 is fully energized and motor 101 is deenergized, and with the gear 114 remaining locked to the casing housing 117 via gears 112, 113, there is a reaction force produced on the casing 117 causing it to rotate about the axis of shaft 109 which is stationary, being held so because of its connection to stationary arm 18 to thereby effect a horizontal or X axis adjustment.

In transport, neither one of the motors need be energized and, indeed, to raise the collapsed reflector from the trailer bed in FIG. 1, which necessitates pivotal movement about the axis of shaft 109 as discussed above, the gears 106, 107 should be free to move.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:
1. A portable and collapsible antenna construction, including a trailer bed having ground engaging wheels on one end and pivoted ground anchor means on the other end, jack means pivoted on said trailer bed for raising said trailer bed on said anchor means from a substantially horizontal position to a substantially vertical position wherein it forms an antenna tower, a pair of arms extending from said one end of said trailer bed and forming a yoke for an antenna reflector, an antenna reflector mounted on said yoke, said reflector includes a hub member pivotally mounted with respect to said yoke, reflecting panels hingedly connected to said hub member, a radial truss member mounting each of said panels, collapsible intercostal members interconnecting adjacent radial truss members, and releasable means interconnecting said truss members to said hub members.

2. A portable and collapsible antenna construction, including a trailer bed having ground engaging wheels on one end and pivoted ground anchor means on the other end, jack means pivoted on said trailer bed for raising said trailer bed on said anchor means from a substantially horizontal position to a substantially vertical position wherein it forms an antenna tower, a pair of arms extending from said one end of said trailer bed and forming a yoke for an antenna reflector, an antenna reflector mounted on said yoke, a drive system interconnecting said yoke with said antenna reflector for moving said reflector in either one of two mutually perpendicular directions, said drive systems includes a pair of mutually perpendicular shafts rotatable in a common casing, one of said shafts being secured to said yoke, the other of said shafts being secured to said antenna reflector, and means for selectively applying torque to said shafts individually.

References Cited
UNITED STATES PATENTS

| | | | |
|---|---|---|---|
| 2,572,430 | 10/1951 | Balton | 343—765 X |
| 2,930,255 | 3/1960 | Bryson | 343—757 X |
| 3,010,106 | 11/1961 | Lippitt et al. | 343—713 X |
| 3,174,397 | 3/1965 | Sanborn | 343—915 X |
| 3,263,232 | 7/1966 | Burwell et al. | 343—713 |

OTHER REFERENCES

Electrical Communication, vol. 39, No. 1, May 26, 1964, pp. 63, 64, 65 relied on.

HERMAN KARL SAALBACH, *Primary Examiner.*

P. L. GENSLER, *Assistant Examiner.*